US006325099B1

(12) United States Patent
Bunschoten et al.

(10) Patent No.: US 6,325,099 B1
(45) Date of Patent: Dec. 4, 2001

(54) COUPLING AND A PISTON FOR USE IN THE SAME

(75) Inventors: Gerrit Klaas Bunschoten; Brian David Haworth; Lambertus Gerardus van der Heijden, all of Maarssen (NL)

(73) Assignee: Diversey Lever, Inc., Plymouth, MI (US)

( * ) Notice: Subject to any disclaimer, the term of this patent is extended or adjusted under 35 U.S.C. 154(b) by 0 days.

(21) Appl. No.: 09/592,878

(22) Filed: Jun. 13, 2000

(51) Int. Cl.$^{7}$ .................................................... F16K 51/00

(52) U.S. Cl. ................................ 137/614.04; 222/321.9; 251/149.6

(58) Field of Search .................. 251/149.6; 137/614.04; 222/321.7, 321.9

(56) References Cited

U.S. PATENT DOCUMENTS

| | | | | |
|---|---|---|---|---|
| 2,509,444 | | 5/1950 | Mitchell . | |
| 3,568,736 | * | 3/1971 | Linch et al. | 137/614.04 X |
| 3,972,387 | * | 8/1976 | Braun | 137/614.04 X |
| 4,119,111 | * | 10/1978 | Allread | 251/149.6 X |
| 4,221,235 | * | 9/1980 | Maldavs | 137/614.04 |
| 4,582,295 | * | 4/1986 | Kugler et al. | 137/614.04 X |
| 4,609,004 | * | 9/1986 | Greene et al. | 251/149.6 X |
| 4,949,745 | | 8/1990 | McKeon . | |
| 4,951,710 | | 8/1990 | Kotake . | |
| 5,211,197 | | 5/1993 | Marrison et al. . | |
| 5,346,177 | * | 9/1994 | Paulsen et al. | 251/149.6 |
| 5,425,404 | * | 6/1995 | Dyer | 222/325 X |
| 5,450,875 | * | 9/1995 | Chichester et al. | 251/149.6 X |
| 5,544,858 | * | 8/1996 | Rogers et al. | 251/149.6 |
| 6,095,190 | * | 8/2000 | Wilcox et al. | 251/149.6 X |

FOREIGN PATENT DOCUMENTS

| | | |
|---|---|---|
| 0 270 302 | 6/1988 | (EP) . |
| 0 448 922 | 10/1991 | (EP) . |
| 0 675 072 | 10/1995 | (EP) . |

OTHER PUBLICATIONS

European Search Report dated Nov. 5, 1999.

* cited by examiner

*Primary Examiner*—Kevin Shaver
*Assistant Examiner*—John Bastianelli

(57) ABSTRACT

The invention pertains to a coupling for a liquid product packaged and dispensing assembly in which liquid is pumped from a container via the coupling through a tube to the point of use. The coupling has a first interconnectable member with a hollow post and a biased sleeve closing openings in the hollow post and a second interconnectable member with a hollow sheath and a biased piston closing an opening at the end of the sheath. The parts are configured so that, upon connection, the post unseats the piston while the sheath displaces the sleeve, thereby allowing liquid flow. The piston and the post are configured such that, upon connection, any fluid residing between them is displaced.

6 Claims, 3 Drawing Sheets

COUPLING AND A PISTON FOR USE IN THE SAME

FIELD OF THE INVENTION

The present invention pertains to a coupling for interconnecting two hollow bodies, such as a container and a tube.

BACKGROUND OF THE INVENTION

Such a coupling is known from, e.g., European patent application 0 270 302, which describes a coupling for a liquid product packaging and dispensing assembly in which liquid is pumped from a container via the coupling through a tube to the point of use. The coupling has a first interconnectable member with a hollow post and a biased sleeve closing openings in the hollow post and a second interconnectable member with a hollow sheath and a biased piston closing an opening at the end of the sheath. The parts are configured so that, upon connection, the post unseats the piston while the sheath displaces the sleeve, thereby allowing liquid flow.

In one form, the container may be collapsible and is preferably situated inside a box for convenience during storage and transport. EP 0 270 302 mentions that a problem arising with such containers resides in that upon uncoupling the container from the tube, residues of the liquid which has been flowing through the coupling between them are apt to be spilled. This can be hazardous if the liquid is noxious, for example if the liquid is a very alkaline product such as industrial mechanical dishwashing liquid.

The coupling according to EP 270 302 indeed has the advantage that when it is disconnected both hollow bodies are sealed, and that it reduces spillage. However, it appeared that after disconnection liquid residues often stay behind on the end of the hollow post and/or on the piston head. These residues of course can be harmful to the persons working with the coupling. Further, the said residues solidify and over time form a crust on the piston head, which crust interferes with the tightness of the seal between the piston head and its seat.

The invention aims to provide a coupling of the above-mentioned type wherein the above-mentioned disadvantages are substantially obviated.

SUMMARY OF THE INVENTION

To this end, the coupling of the invention is characterised in that, upon connection of the members, the central area of the surface of the piston head initially contacts just the central area of the surface of the closed end of the post and the established contact area subsequently expands away from its centre thus displacing any fluid residing between the said surfaces.

It is preferred that the surface of the piston head is convex and the surface of the closed end of the post is concave, the radius of curvature of the piston head being smaller than the radius of curvature of the closed end of the post. Also, the piston head and/or the closed end of the post preferably is made of a flexible material.

If the piston is gas permeable and liquid impermeable, substantial underpressures in the container and malfunctions resulting from such underpressures, such as interruption of the flow, are avoided.

It will generally be desirable for the various parts to be co-axial, that is to say for the sheath and piston to be co-axial and for the sleeve and post to be co-axial and, moreover, for all four of them to lie on a common axis when coupled.

The invention will be further explained by reference to the drawings in which an embodiment of a coupling of the invention is schematically shown.

BRIEF DESCRIPTIONS OF THE DRAWINGS

DETAILED DESCRIPTION OF THE PREFERRED EMBODIMENT

Figure 1:
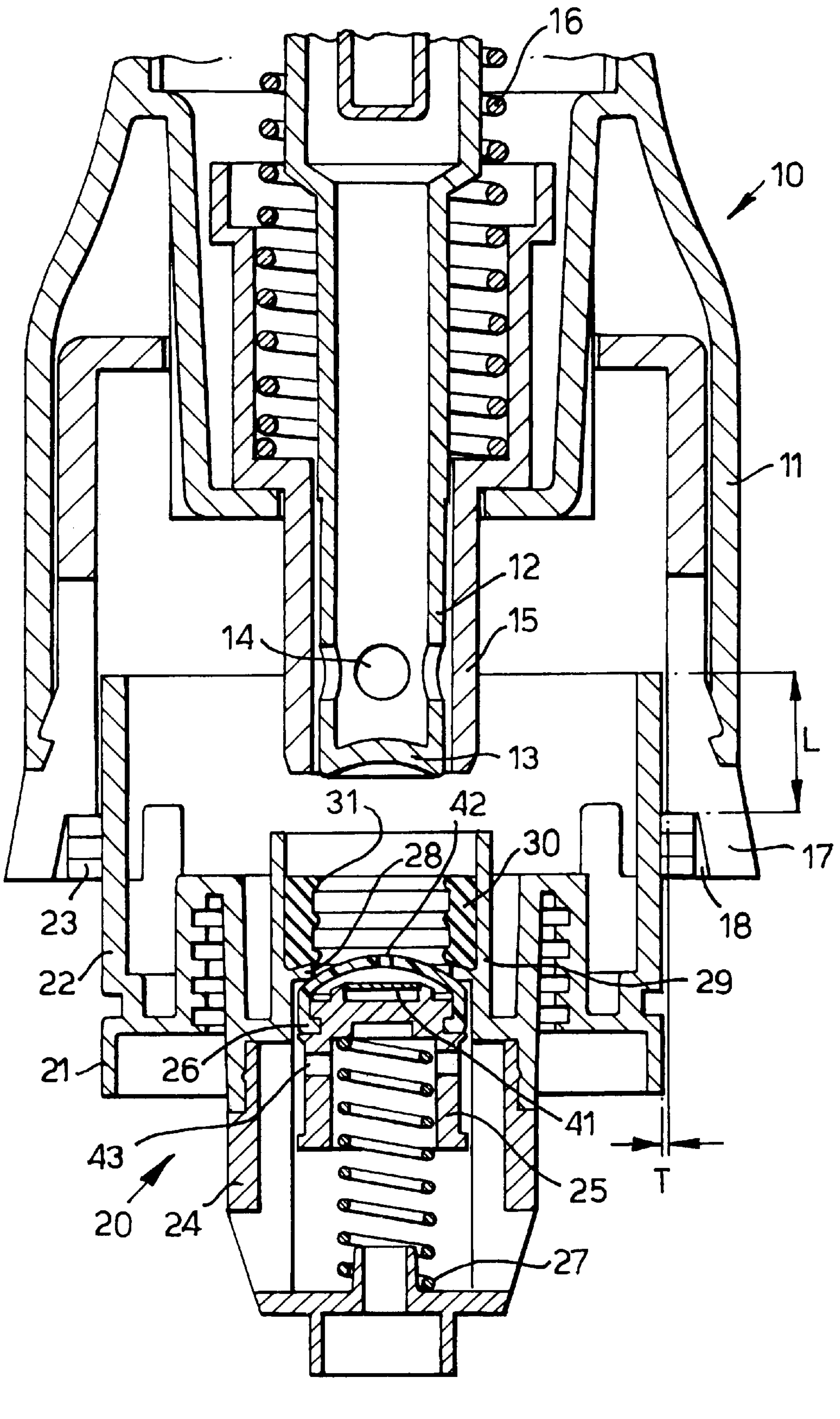
FIG. 1 shows a schematic cross-section of a coupling in accordance with the present invention, at the first stage of establishing a connection.

FIG. 1 shows a coupling for interconnecting two hollow bodies, such as a collapsible or rigid container and a tube. The coupling comprises a first interconnectable member 10 comprising a housing 11 and, fitted within the housing 11, a hollow post 12 of which the interior communicates with the interior of the body to which the first member is attached. The post 12 has a closed end 13 and four openings 14 situated behind the closed end 13. The post 12 is surrounded by a seal sleeve 15 which is biased by a spring 16 into a position covering the openings 14 to prevent outflow from the interior of the post 12. The housing 11 is fitted with a cylindrical key 17, which is provided with spiral grooves 18 on its inner side and which preferably has an inner diameter within a range from 40 to 80 mm.

FIG. 1 further shows a second interconnectable member 20 comprising a cap 21 having a cylindrical portion or wall 22 having an outer diameter smaller than the inner diameter of the key 17 and provided with two lugs or projections 23 on its outer side. The projections 23 are each located at a distance from the end of the cylindrical wall 22, so that the second member 20 must be inserted into the first member over a certain length "L", for example 13 mm, before the projections 23 arrive at the beginning of the corresponding grooves 18. Said length "L" should preferably be in excess of 10 mm (and, for practical reasons, preferably be smaller than 25 mm).

Conversely, grooves can be provided on the outer side of the cap 21. In that case, projections should be provided on the inner side of a cylindrical wall in the first member located at a certain distance from the end the said wall.

The pitch of the grooves 18 preferably exceeds the inner radius of the key 17, so as to enable connection through limited rotation of the members 10, 20.

A basket 24 is fitted in the under side of the cap 21, which basket 24 comprises a piston 25 provided with a piston head 26. The cap (21) and basket (24) form a hollow sheath. The piston 25, 26 is biased by means of a spring 27 into a position closing an aperture 28 in the cap 21. The cap 21 comprises an annular raised edge 29, which has an inner diameter substantially equal to or slightly larger than the outer diameter of the seal sleeve 15 of the first member 10. A rubber ring 30 is fitted inside the annular edge 29, which ring 30 has a height smaller than the height of the annular edge 29 and has an inner diameter substantially equal to or slightly larger than the outer diameter of the post 12 of the first member 10. The ring 30 is provided with three annular ridges 31 on its inner surface, which will improve the close fit and, upon disconnection of the members 10, 20, will wipe the post 12 as it is drawn through the ring 30.

The piston head 26 is made of an flexible material, e.g. an elastomer, and its surface is convex. Further, the surface of the closed end 13 of the post 12 is concave, with the radius of curvature of the piston head 26 being selected smaller than the radius of curvature of the closed end 13 of the post 12. Thus, any fluid present between the said surfaces is displaced during connection of members 10, 20 and fluid build-up or inclusion between the said surfaces is avoided.

Further, the piston 25 can be provided with a gas permeable and liquid impermeable membrane 41 so as to reduce underpressure in the container, which underpressure for instance results from the removal of liquid from the container. If such a membrane 41 is being used, the piston head 26 should be gas permeable. This can be achieved by simply providing a perforation or hole 42 in the piston head 26. To improve gas communication between the membrane and the interior of the container, one or more openings 43 can be provided in the wall of the piston 25.

Alternatively, the said membrane can be positioned in the cap 21, thus enabling the reduction of underpressure even when the members 10, 20 are connected.

The membrane is preferably made of a microporous polymer film or foil, such as (bi-axially) stretched PTFE.

FIG. 1 shows the first stage of establishing the interconnection between the members 10 and 20. The tolerance "T" between the wall 22 and the key 17 (i.e., half the difference between the inner diameter of the key 17 and the outer diameter of the wall 22) amounts to 0.5 mm and preferably lies within a range from to 0.3 to 1.0 mm, or, more generally, within a range from 0.5 to 2% of the inner diameter of the key 17. Owing to this tolerance the cap can be easily inserted in the said key 17. If the ratio of this tolerance "T" and the length "L" over which the second members must be inserted into the first member (i.e., "T/L") is smaller than 0.10, the centering of the members with respect to each other will occur effectively and automatically and the risk of any of the projections 23 missing the beginning of the grooves 18 is avoided. Also, the post 12 and the piston 24 will also center automatically during the next stage of establishing the connection.

It is noted that the coupling may comprise two or more of the said projections and corresponding grooves, with at least two of the projections being different in shape and/or width and the corresponding grooves being matched accordingly. In an environment where several containers with different contents are being used, a mix-up of interconnectable members can be avoided by using different combinations of such different projections. The advantages of employing couplings with the ratio "T/L" in the fore-mentioned range are all the more noticeable when the number of (different) projections in a particular coupling increases.

Figure 2:
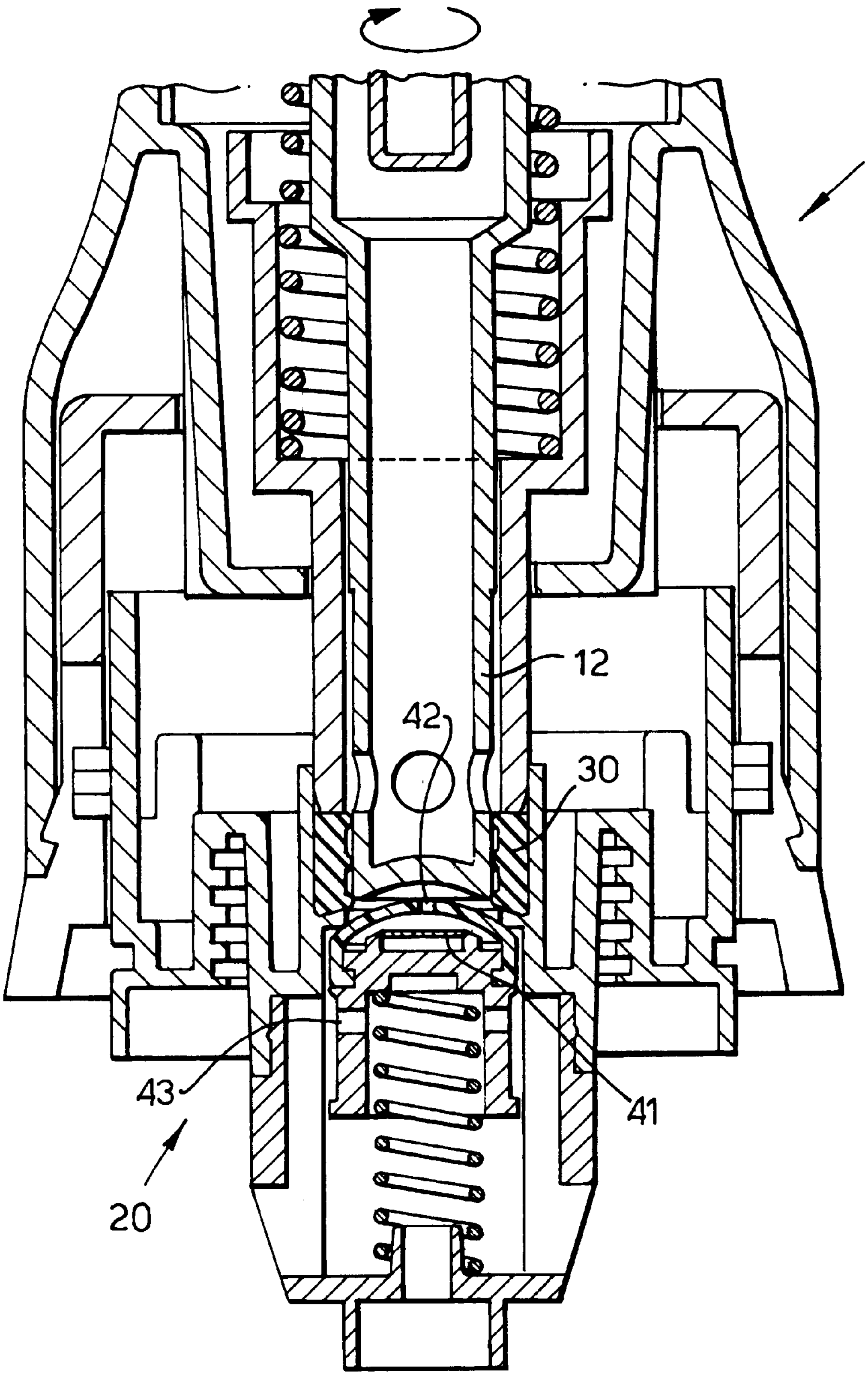
FIGS. 2 and 3 show a schematic cross-section of the coupling of FIG. 1, respectively at the second and third stage of establishing a connection.
Figure 3:
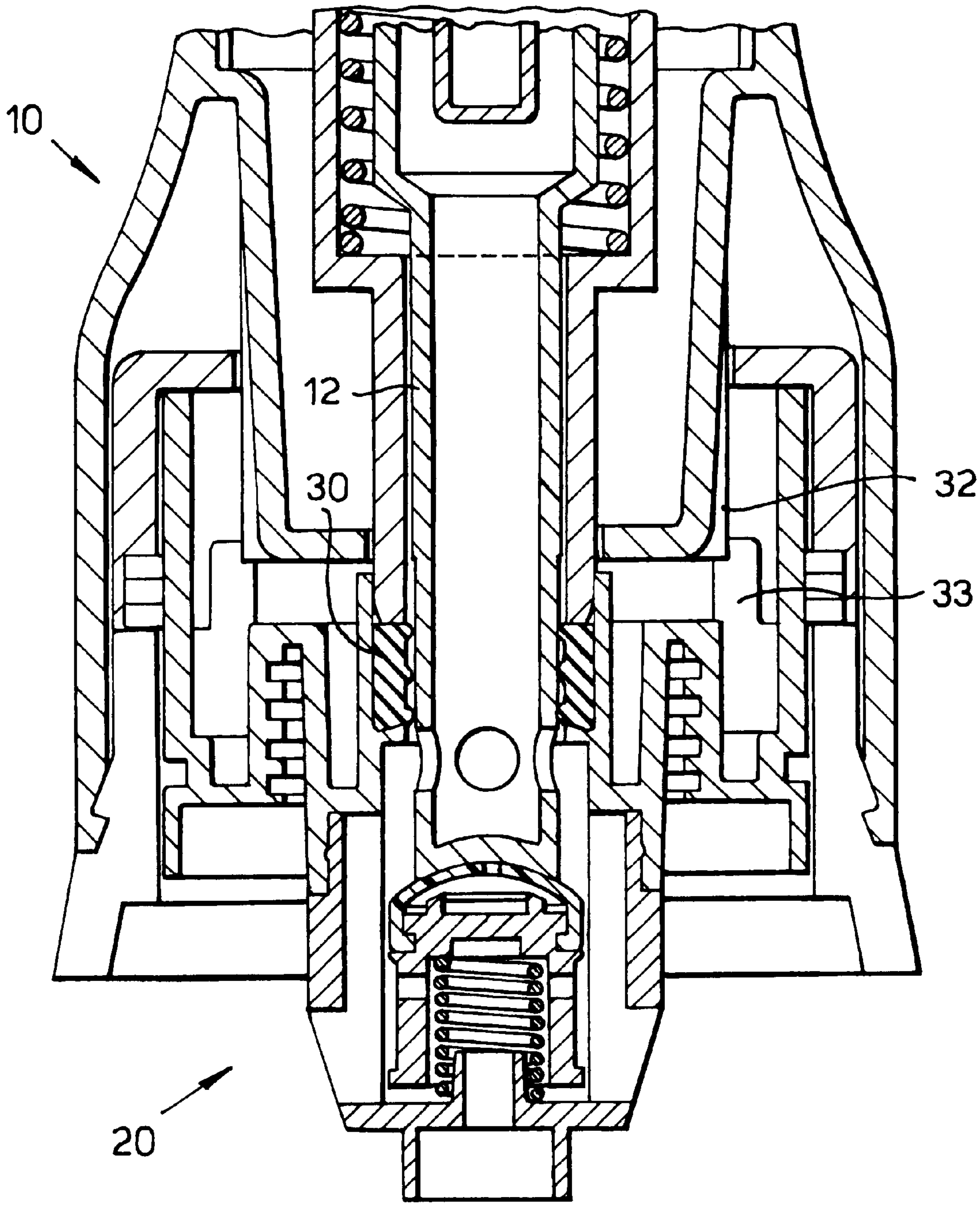

After insertion and centering, the members 10 and 20 are, as shown in FIGS. 2 and 3, rotated with respect to one another, thus establishing contact between the seal sleeve 15 and the rubber ring 30. During further rotation, the post 12 starts moving relative to the biased seal sleeve 15 because the latter is halted by the said ring 30.

By this action the post 12 is now inserted in and surrounded by the ring 30 and the ring 30 is (slightly) compressed in the axial direction by the seal sleeve 15 as result of which the ring 30 begins to expand (slightly) in the radial direction towards the post 12. In this stage, the friction between the post 12 and the ring 30 is still relatively low, so as to allow easy rotation of the members by an operator. Further , the central area of the surface of the piston head 26 will now contact the central area of the surface of the closed end 13 of the post 12. The established contact area will subsequently expand away from its centre thus displacing any fluid residing between the said surfaces and contamination or crust formation by such fluid during or after disconnection of the coupling is avoided.

FIG. 3 shows the final stage of establishing the connection. The members 10, 20 have been rotated over a total angle of approximately 45° and the ring 30 is compressed to such an extend that it completely seals off the post 12. The shape of the inner side of the ring 30 is now adapted to the shape of the post 12 and a close fit is obtained, even if the post 12 has been subjected to considerable wear after several years of use.

One of the members may be provided with a cam 32, whereas the other member is provided with a thin plastic finger 33. The cam 32 and finger 33 are positioned such that, during rotation of the members 10, 20, the cam 32 passes the finger 33, causing the finger 33 to bend and, substantially simultaneously to establishing an adequate connection, snap back into its original position so as to produce an audible sound, e.g. a distinct click, and warn the operator that no further rotation is required.

Alternatively, a finger can be provided in the key 17 at the end of at least one of the grooves 18. Once the projections 23 reach the end of their respective grooves and the members 10, 20 are rotated slightly further, the projection or projections 23 will pass the finger or fingers. Thus, the finger or fingers are caused to bend and snap back in manner similar to that described above or, in case of a rigid finger, the projection is halted until it slips abruptly and collides with a stop positioned behind (as seen in the direction of movement of the projection) the finger.

In a further development of the invention, one of the two members includes or is connected to a chamber having means for detecting the presence of liquid in the chamber.

Preferably, this will be the member which is connected to a tube. This preferred feature is useful in systems handling a liquid product where it is necessary or desirable to detect that the container has emptied and then shut off a pump and/or sound an alarm calling for the container to be replaced. For detecting liquid in the chamber, the chamber may contain a Reed-element or spaced apart electrodes so that the liquid when present provides a conductive path between the electrodes. Whatever means are used to detect the presence of liquid, it may be desirable for the chamber to have a valve which is biased closed but arranged open to admit air to the chamber in the event that a pre-determined sub-atmospheric pressure is created within the chamber, for example if a pump drawing from the chamber is continuing to run when the supplying container is empty.

Although the form of the coupling according to the invention was described particularly for the application indicated above, it can also be employed in other applications where it would be advantageous to provide a coupling preventing leakage from two hollow bodies when these are disconnected and also minimising spillage during the said disconnection.

Thus, the invention is not restricted to the above described embodiment which can be varied in a number ways within the scope of the claims.

What is claimed is:

1. A coupling for interconnecting two hollow bodies, the coupling comprising first and second interconnectable members (10, 20) for attachment of each one to an orifice of a respective body so as to allow fluid flow between the interiors of the bodies when interconnected by the coupling and to seal the orifices when uncoupled, the first member (10) comprising a hollow post (12) of which the interior communicates with the interior of the body to which the first member (10) is attached, the hollow post (12) having a closed end (13) and at least one opening (14) behind the end (13), the first member (10) further comprising a sleeve (15) around the post (12) biased into a position sealing the opening (14), the second member (20) comprising a piston (25, 26) within a hollow sheath (21, 24) of which the interior communicates with the interior of the body to which the second member (20) is attached, the piston (25, 26) being biased into a position closing an aperture (28), the post (12), sleeve (15), piston (25, 26) and sheath (21, 24) being configured such that, upon connection of the members (10, 20), the closed end (13) of the post (12) extends through the aperture (28) in the sheath (21, 24) thereby contacting an displacing the piston (25, 26) against its bias, displacing the sleeve (15) against its bias to a position for uncovering the opening (14) and allowing flow between the hollow interiors of the sheath (21, 24) and the post (12), characterized in that, upon connection of the members (10, 20), the central area of the surface of the piston head (265) initially contacts just the central area of the surface of the closed end (13) of the post (12) and that the established contact area subsequently expands away from its center thus displacing fluid residing between the said surfaces wherein the piston head (26), is gas permeable, and the coupling has a gas permeable and liquid impermeable membrane (41) under the piston head (26).

2. Coupling according to claim 1, wherein the surface of the piston head (26) is convex and the surface of the closed end (13) of the post (12) is concave, the radius of curvature of the piston head (26) being smaller than the radius of curvature of the closed end (13) of the post (12).

3. A coupling according to claim 1, wherein the piston head (26) or the closed end (13) of the post (12) is made of a flexible material.

4. A coupling according to claim 1, wherein the membrane (41) is made of a microporous polymer.

5. A piston (25, 26) suitable for use in the coupling according to claim 1, which piston (25, 26) is gas permeable and liquid impermeable.

6. A piston according to claim 5, wherein the membrane (41) is made of a microporous polymer.

* * * * *